US012341295B2

(12) United States Patent
Yamada et al.

(10) Patent No.: US 12,341,295 B2
(45) Date of Patent: Jun. 24, 2025

(54) CONNECTOR HAVING A REGULAR FITTING DETECTING MEMBER

(71) Applicant: J.S.T. MFG. CO., LTD., Tokyo (JP)

(72) Inventors: Hiroshi Yamada, Miyoshi (JP); Tomoya Nakagawa, Miyoshi (JP)

(73) Assignee: J.S.T. MFG. CO., LTD., Tokyo (JP)

( * ) Notice: Subject to any disclaimer, the term of this patent is extended or adjusted under 35 U.S.C. 154(b) by 257 days.

(21) Appl. No.: 17/726,464

(22) Filed: Apr. 21, 2022

(65) Prior Publication Data

US 2022/0344870 A1 Oct. 27, 2022

(30) Foreign Application Priority Data

Apr. 21, 2021 (JP) ................................ 2021-071963

(51) Int. Cl.
*H01R 13/641* (2006.01)
*H01R 13/631* (2006.01)

(52) U.S. Cl.
CPC ......... *H01R 13/641* (2013.01); *H01R 13/631* (2013.01)

(58) Field of Classification Search
CPC ............................ H01R 13/641; H01R 13/631
See application file for complete search history.

(56) References Cited

U.S. PATENT DOCUMENTS 5,203,718 A * 4/1993 Chishima ............ H01R 13/641 439/350
7,909,638 B2 * 3/2011 Seo .................... H01R 13/6272 439/352
8,747,146 B2 * 6/2014 Brown ................. H01R 13/639 439/489
9,893,464 B2 * 2/2018 Endo .................... H01R 13/639
11,177,612 B2 * 11/2021 Chiang ................ H01R 13/436
11,594,838 B2 * 2/2023 Little ..................... H01R 13/64
(Continued)

FOREIGN PATENT DOCUMENTS

JP 2001-185290 A 7/2001
JP 2006-260869 A 9/2006
(Continued)

*Primary Examiner* — Vanessa Girardi
(74) *Attorney, Agent, or Firm* — Kratz, Quintos & Hanson, LLP

(57) ABSTRACT

A connector includes a housing which allows for insertion and fitting into a mating connector in an insertion direction perpendicular to a height direction and to a width direction, and a regular fitting detecting member. The regular fitting detecting member is supported on an outer wall surface of the housing so as to be slidable in the insertion direction to a non-detection position and a detection position. The regular fitting detecting member includes a base portion which has a detecting portion which allows for detecting regular fitting at the detection position, and an elastic piece and a pair of guide pieces which extend in the insertion direction from the base portion. The guide pieces allow for guiding sliding of the regular fitting detecting member by engagement with the housing. The elastic piece allows for the regular fitting detecting member to move to the detection position by being elastically deformed in the width direction. A lower surface of the elastic piece and lower surfaces of the guide pieces are disposed in a manner that shifts the position in the height direction.

8 Claims, 11 Drawing Sheets

(56) References Cited

U.S. PATENT DOCUMENTS

| | | | |
|---|---|---|---|
| 2001/0005648 | A1 | 6/2001 | Kurimoto |
| 2009/0170362 | A1 | 7/2009 | Nakamura |
| 2010/0285677 | A1 | 11/2010 | Sekino |
| 2017/0250492 | A1 | 8/2017 | Endo |

FOREIGN PATENT DOCUMENTS

| | | | |
|---|---|---|---|
| JP | 2009-087715 | A | 4/2009 |
| JP | 2009-158263 | A | 7/2009 |
| JP | 2011-040327 | A | 2/2011 |
| JP | 2014-056718 | A | 3/2014 |
| JP | 2017-152272 | A | 8/2017 |
| JP | 2020-017344 | A | 1/2020 |
| KR | 10-2017-0043444 | A1 | 4/2017 |

* cited by examiner

CONNECTOR HAVING A REGULAR FITTING DETECTING MEMBER

CROSS REFERENCE TO RELATED APPLICATION

This application claims the benefit of priority to Japanese Patent Application No. 2021-071963 filed on Apr. 21, 2021. The entire contents of this application are hereby incorporated herein by reference.

BACKGROUND OF THE INVENTION

Field of the Invention

The present invention relates to a connector and a connector pair.

Description of Related Arts

The connector described in Japanese Unexamined Patent Publication No. 2006-260869 includes a connector position detecting member that detects a regular fitting state of a set of connectors. The connector position detecting member is movably supported by a housing of one connector. The connector position detecting member includes a base portion, a pair of elastic pieces extending from the base portion toward a housing of the other connector, and a pair of support arms extending from the base portion parallel to the pair of elastic pieces. The pair of support arms are disposed on both sides of the pair of elastic pieces.

When the connector is fitted, when a wedge piece of the other connector expands the pair of elastic pieces, the connector position detecting member is released from a holding state with respect to one housing, and becomes movable toward the other housing by being guided by the pair of support arms. By the movement, a flange of the connector position detecting member abuts against the one housing, and regular fitting is detected.

SUMMARY OF THE INVENTION

The inventor of preferred embodiments of the present invention described and claimed in the present application conducted an extensive study and research regarding connectors and connector pairs, such as the one described above, and in doing so, discovered and first recognized new unique challenges and previously unrecognized possibilities for improvements as described in greater detail below.

In the connector described in Japanese Unexamined Patent Publication No. 2006-260869, a lower surface of the elastic piece and a lower surface of the support arm are disposed at the same height position. For this reason, in a case where some of the terminals out of a plurality of terminals that are disposed at a lower side of an outer wall surface of the housing are provided as terminals that are larger in size than the remaining terminals, if some of the terminals are shifted in position in the width direction so as to prevent the connector from increasing in size in the height direction, the connector is increased in size in the width direction.

Therefore, a preferred embodiment of the present invention provides a connector and a connector piece which allows for preventing an increase in size.

In order to overcome the previously unrecognized and unsolved challenges described above, a preferred embodiment of the present invention provides a connector including a housing, a plurality of terminals, and a regular fitting detecting member. The housing has a height direction and a width direction perpendicular to each other. The housing is configured to inserted and fitted into an insertion chamber of a mating housing of a mating connector in an insertion direction perpendicular to the height direction and the width direction. The plurality of terminals are respectively housed in a plurality of terminal housing holes formed in the housing. The regular fitting detecting member is supported on an outer wall surface along the insertion direction of the housing so as to be slidable in the insertion direction to a non-detection position and a detection position positioned further in the insertion direction than the non-detection position. The regular fitting detecting member is configured to detect regular fitting with the mating connector. The regular fitting detecting member includes a base portion, an elastic piece, and a pair of guide pieces. The base portion has a detecting portion which allows for detecting the regular fitting by abutting against the housing at the detection position. The elastic piece extends in the insertion direction from the base portion. The elastic piece allows for the regular fitting detecting member to move to the detection position by being elastically deformed in the width direction. The pair of guide pieces are engaged with the housing to guide sliding of the regular fitting detecting member. The elastic piece includes a lower surface.

Each of the pair of guide pieces includes a lower surface. The lower surface of the elastic piece and the lower surface of each of the pair of guide pieces are disposed in a manner that shifts the position in the height direction.

With this structural arrangement, it becomes possible to dispose the lower surface of the elastic piece and the lower surfaces of the pair of guide pieces of the regular fitting detecting member disposed on the outer wall surface of the housing, in a manner that shifts the position in the height direction according to a size and layout of the terminals to be disposed at the lower side of the outer wall surface. Therefore, the connector can be prevented from increasing in size.

In a preferred embodiment of the present invention, the outer wall surface includes a central guide portion which is configured to guide the lower surface of the elastic piece, and a pair of side guide portions which are configured to guide the lower surfaces of the pair of guide pieces. With this structural arrangement, in the outer wall surface, the central guide portion to guide the lower surface of the elastic piece and the pair of side guide portions to guide the lower surfaces of the pair of guide pieces are disposed in a manner that shifts the position in the height direction, whereby height positions of the central guide portion and the side guide portions can be adapted to the size and layout of the terminals to be disposed at the lower side of the top wall surface.

In a preferred embodiment of the present invention, the plurality of terminals include a plurality of central terminals and a pair of side terminals, as viewed in the insertion direction. The plurality of central terminals align in the width direction downward or obliquely downward of the elastic piece. The pair of side terminals are disposed downward or obliquely downward of the pair of guide pieces and on both sides in the width direction with respect to the plurality of central terminals. With this structural arrangement, it becomes possible to shift the lower surface of the elastic piece in position in the height direction from the lower surface of the guide piece, according to differences in size between the central terminals and the side terminals.

In a preferred embodiment of the present invention, the connector further includes a locking mechanism which includes a support portion supported on the outer wall surface and an arm portion extending from the support portion parallel to the insertion direction, and is configured to lock a fitting state with respect to the mating connector. The elastic piece is disposed at least in part downward of the arm portion. The pair of guide pieces are disposed on both sides with the locking mechanism interposed in the width direction. The lower surface of the guide piece is disposed higher in position than the lower surface of the elastic piece. The side terminal is a terminal larger in size than the central terminal. With this structural arrangement, a height position of the lower surface of the guide piece is made higher than a height position of the lower surface of the elastic piece that corresponds to the side terminal larger in size than the central terminal.

In a preferred embodiment of the present invention, the central terminal includes a signal terminal, and the side terminal includes a power terminal. With this structural arrangement, it becomes possible to make the height of the lower surface of the guide piece correspond to the power terminal that is larger in size than the signal terminal higher than the height of the lower surface of the elastic piece that corresponds to the signal terminal.

In a preferred embodiment of the present invention, the connector further includes a pair of protective ribs which protect the locking mechanism. The pair of protective ribs are respectively formed in a protruding manner on the outer wall surface of the housing, and extend in the insertion direction at both sides with the locking mechanism interposed in the width direction. The guide piece includes an upper surface. Each of the pair of protective ribs includes an upper surface. The upper surface of the guide piece is at a height equal to or lower than the upper surface of each of the pair of protective ribs.

With this structural arrangement, the pair of guide pieces of the regular fitting detecting member can be disposed so that the pair of guide pieces of the regular fitting detecting member do not exceed the height of the upper surfaces of the pair of protective ribs that are as a rule provided on both sides of the locking mechanism. Therefore, the connector can be prevented from increasing in size in the height direction.

In a preferred embodiment of the present invention, the housing includes a projection which protrudes in the height direction from the outer wall surface. The regular fitting detecting member includes a pair of the elastic pieces. The pair of elastic pieces which are configured to hold the regular fitting detecting member at the non-detection position by clamping the projection in the width direction. The pair of elastic pieces are configured to release latching with respect to the projection by being expanded and opened by a releasing piece disposed in the insertion chamber of the mating connector when the connector is fitted to the mating connector. With this structural arrangement, the latching and releasing of the latching with respect to the projection by the pair of elastic pieces are performed as reliable operations.

A preferred embodiment of the present invention provides a connector pair including the connector and the mating connector to be fitted with the connector. With this structural arrangement, an increase in size of the connector pair can be prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments that specifically embody the present invention will hereinafter be described with reference to the drawings.

Figure 1:
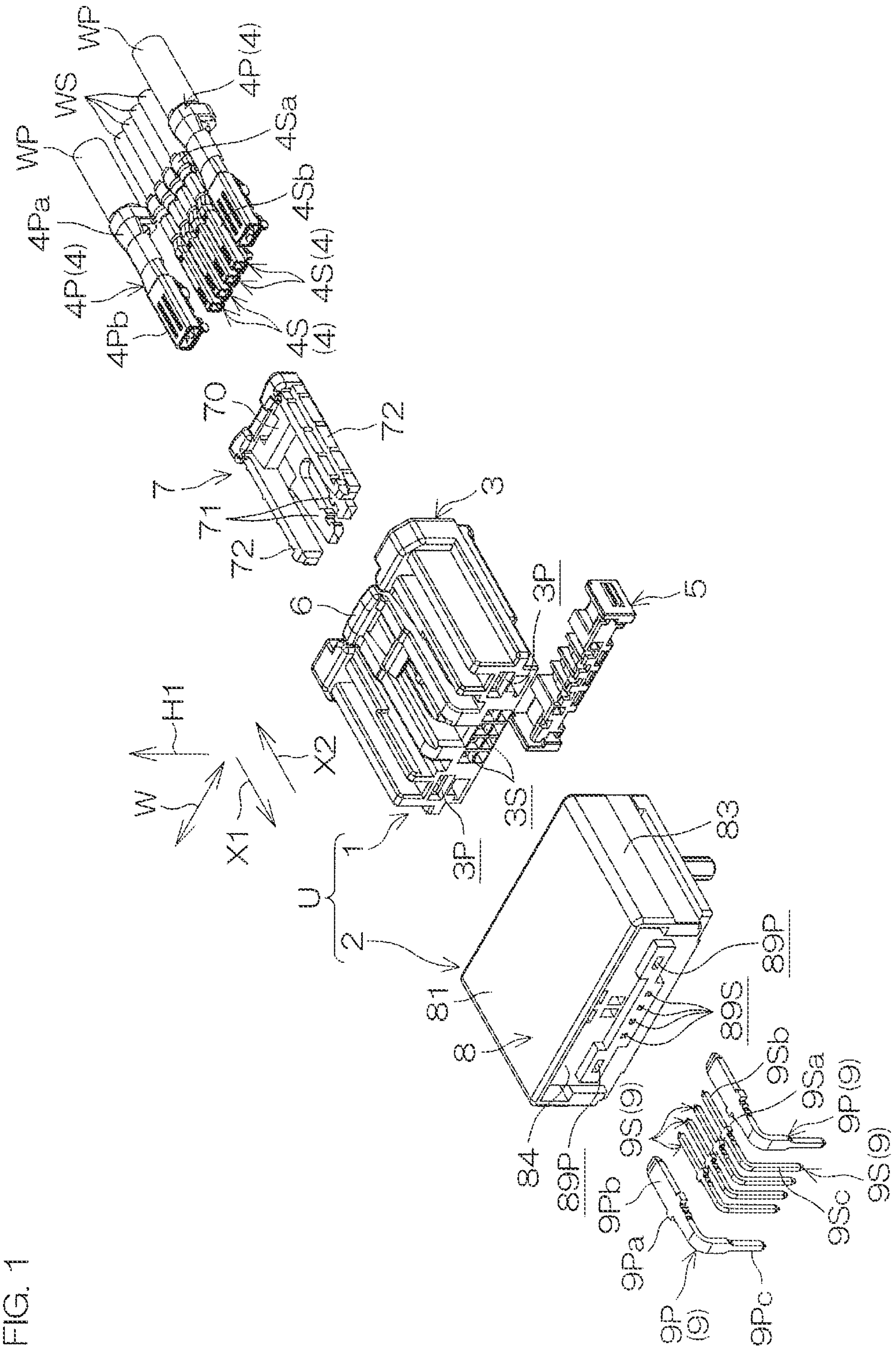
FIG. 1 is an exploded perspective view of a connector pair including a connector and a mating connector of a preferred embodiment of the present invention.

FIG. 1 is an exploded perspective view of a connector pair U including a connector 1 and a mating connector 2 according to a preferred embodiment of the present invention.

The connector 1 is a plug connector, and includes an insulating housing 2, a plurality of terminals 4, a retainer 5, a locking mechanism 6, and a regular fitting detecting member 7. The mating connector 2 is a receptacle connector, and includes an insulating mating housing 8 that forms an insertion chamber 100 (see FIG. 2A), and a plurality of mating terminals 9.

The housing 3 has a height direction H1 and a width direction W perpendicular to each other. The housing 3 of the connector 1 being a plug connector is insertion-fitted with respect to the insertion chamber 100 of the mating housing 8 of the mating connector 2 being a receptacle connector along an insertion direction X1 that is perpendicular to the height direction H1 and the width direction W.

In the connector 1, the retainer 5 is attached to the housing 3 and latched on the plurality of terminals 4, thereby serving to prevent the plurality of terminals 4 from detaching from the housing 3. The locking mechanism 6 serves to lock a fitting state of the connector 1 with respect to the mating connector 2. The regular fitting detecting member 7 serves to detect that the connector 1 is regularly fitted with respect to the mating connector 2.

The plurality of terminals 4 of the connector 1 include a plurality of signal terminals 4S serving as central terminals disposed aligned in the width direction W, and a pair of power terminals 4P serving as side terminals disposed on both sides with the plurality of signal terminals 4S interposed in the width direction W. The signal terminals 4S and the power terminals 4P are collectively referred to simply as terminals 4. The power terminals 4P are terminals that are larger in size than the signal terminals 4S. Each signal terminal 4S includes an electric wire connecting portion 4Sa to be connected with an electric wire WS, and a box shaped female contact portion 4Sb. Each power terminal 4P includes an electric wire connecting portion 4Pa to be connected with an electric wire WP, and a box shaped female contact portion 4Pb.

The mating connector 2 is a connector which is, for example, mounted on a surface of a substrate (not shown). The plurality of terminals 9 of the mating connector 2 include a plurality of mating signal terminals 9S which align in the width direction W, and a pair of mating power terminals 9P disposed on both sides with the plurality of mating signal terminals 9S interposed in the width direction W. The mating signal terminals 9S and the mating power terminals 9P are collectively referred to simply as mating terminals 9. The mating power terminals 9P are terminals that are larger in size than the mating signal terminals 9S.

Each mating signal terminal 9S includes a fixing portion 9Sa, a male contact portion 9Sb, and a substrate connecting portion 9Sc. Each mating signal terminal 9S is formed of a pair of boards that are connected perpendicularly, and is configured with the fixing portion 9Sa and the male contact portion 9Sb disposed on one board, and the substrate connecting portion 9Sc disposed on the other board.

Each mating power terminal 9P includes a fixing portion 9Pa, a male contact portion 9Pb, and a substrate connecting portion 9Pc. Each mating power terminal 9P is formed of a pair of boards that are connected perpendicularly, and is configured with the fixing portion 9Pa and the male contact portion 9Pb disposed on one board, and the substrate connecting portion 9Pc disposed on the other board.

With respect to the female contact portion 4Sb of each one of the signal terminals 4S of the connector 1, the male contact portion 9Sb of a corresponding mating signal terminal 9S of the mating connector 2 is insertion-fitted and connected. With respect to the female contact portion 4Pb of each one of the power terminals 4P of the connector 1, the male contact portion 9Pb of a corresponding mating power terminal 9P of the mating connector 2 is insertion-fitted and connected.

First, the mating connector 2 will be described in detail.

Figure 2A:
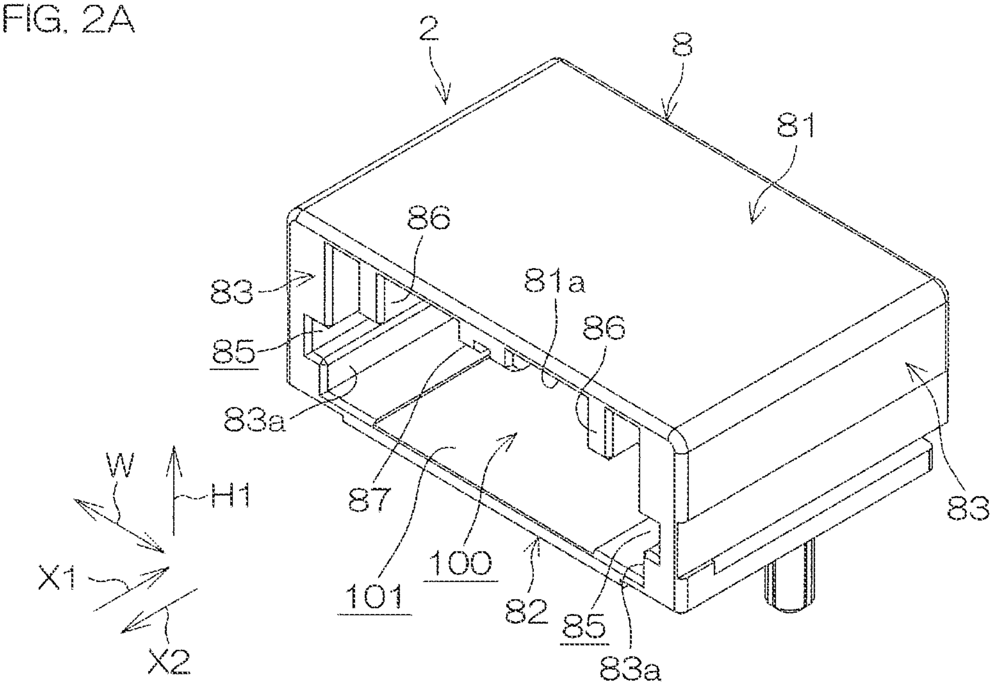
FIG. 2A is a perspective view of the mating connector.
Figure 2B:
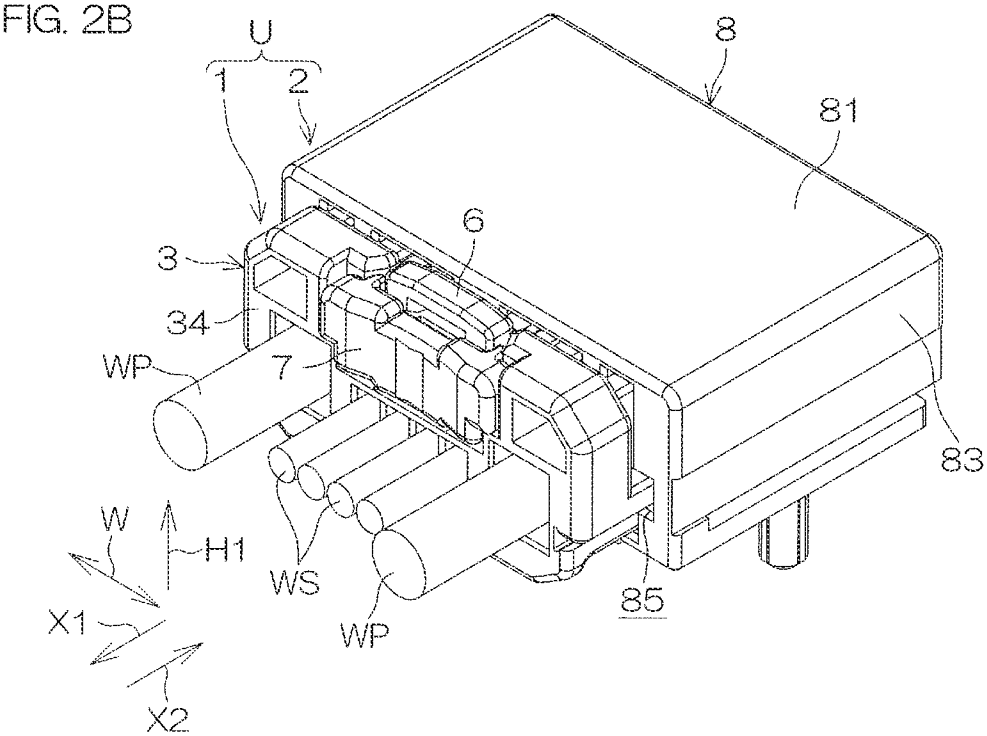
FIG. 2B is a perspective view of the connector pair in a fitting state.

FIG. 2A is a perspective view of the mating connector 2. FIG. 2B is a perspective view of the connector pair U in a fitting state. As shown in FIG. 1 and FIG. 2A, the mating housing 8 of the mating connector 2 includes a top wall portion 81, a bottom wall portion 82, a pair of sidewall portions 83, and a rear wall portion 84. The mating housing 8 forms, at a side closer to the connector 1 (that is, in a direction X2 opposite to the insertion direction X1), the insertion chamber 100 (see also FIG. 8) that is opened by an entrance opening 101.

Figure 8:
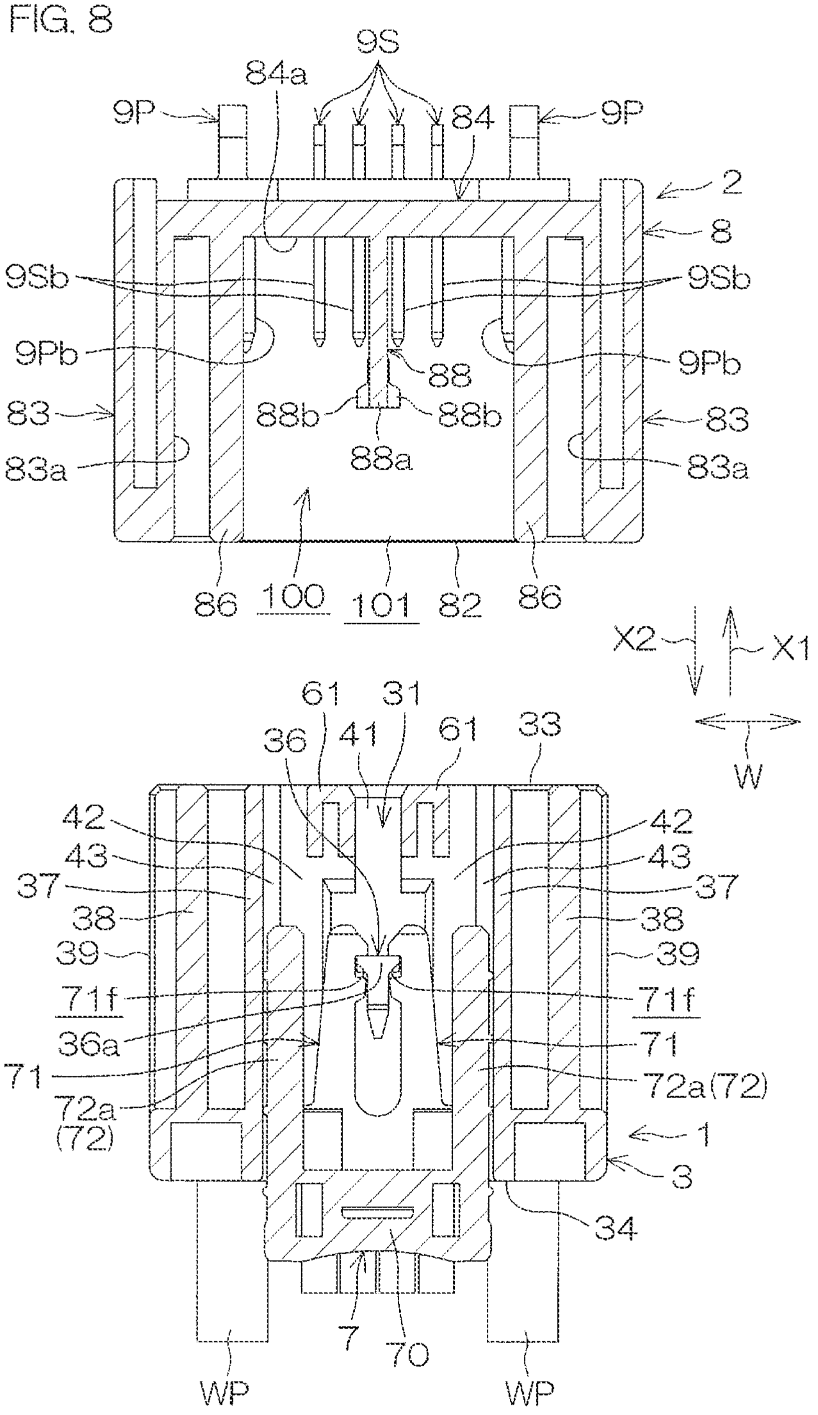
FIG. 8 is a transverse cross-sectional view of the connector pair before fitting.

The insertion chamber 100 is formed by being demarcated by the top wall portion 81, the bottom wall portion 82, the pair of sidewall portions 83, and the rear wall portion 84 (see FIG. 8). As shown in FIG. 2A and FIG. 2B, the housing 3 of the connector 1 is insertion-fitted in the insertion direction X1 with respect to the insertion chamber 100 of the mating housing 8 of the mating connector 2.

As shown in FIG. 2A, on an inner wall surface 83*a* of each sidewall portion 83, a guide groove 85 showing a groove shape in a section and extending in the insertion direction X1 from the entrance opening 101 is formed. A pair of guide ribs 86 are formed in a protruding manner from an inner wall surface 81*a* of the top wall portion 81. The pair of guide ribs 86 are disposed in proximity to each corresponding sidewall portion 83, and extend in the insertion direction X1 from the entrance opening 101. The guide groove 85 and the guide ribs 86 are engaged with corresponding portions of the housing 3 of the connector 1 so as to guide the insertion fitting of the housing 3 with respect to the insertion chamber 100.

Further, a latching portion 87 is formed in a protruding manner from a central portion in the width direction W of the inner wall surface 81*a* of the top wall portion 81. The latching portion 87 is disposed in the vicinity of the entrance opening 101 of the insertion chamber 100. The locking mechanism 6 of the connector 1 is latched on the latching portion 87.

A releasing piece 88 is formed in a protruding manner that extends from an inner wall surface 84*a* (see FIG. 8) of the rear wall portion 84 toward the connector 1 (in the opposite direction X2 to the insertion direction X1) up to substantially a central position of the insertion chamber 100. At a distal end portion 88*a* of the releasing piece 88, a pair of trapezoidal wing portions 88*b* that protrude bilaterally are formed. In the rear wall portion 84, a plurality of fixing holes 89S, 89P (see FIG. 1) into which the plurality of mating terminals 9 are respectively inserted and fixed are formed in a penetrating manner.

The fixing portion 9Sa of each mating signal terminal 9S is inserted and fixed into the fixing hole 89S. The fixing portion 9Pa of each mating power terminal 9P is inserted and fixed into the fixing hole 89P. The substrate connecting portion 9Sc (see FIG. 6A) of each mating signal terminal 9S is connected to a signal pattern of the substrate (not shown). The substrate connecting portion 9Pc (see FIG. 6A) of each mating power terminal 9P is connected to a power pattern of the substrate (not shown).

Figure 6A:
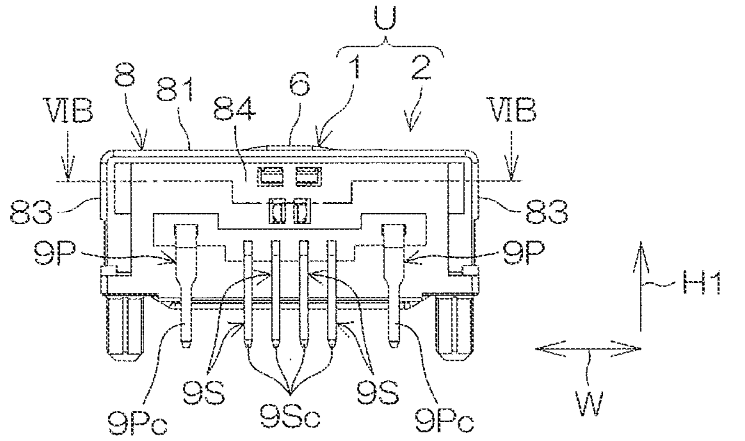
FIG. 6A is a rear view of the connector pair.

As shown in FIG. 8, the male contact portions 9Sb of the mating signal terminals 9S and the male contact portions 9Pb of the mating power terminals 9P are disposed in the insertion chamber 100 in a state where they protrude from the inner wall surface 84*a* of the rear wall portion 84 in the opposite direction X2 to the insertion direction X1. As shown in FIG. 6A, the substrate connecting portions 9Sc of the mating signal terminals 9S and the substrate connecting portions 9Pc of the mating power terminals 9P extend toward the substrate (not shown) positioned downward in a state where they protrude outside from the rear wall portion 84.

Next, the connector 1 will be described.

Figure 3A:
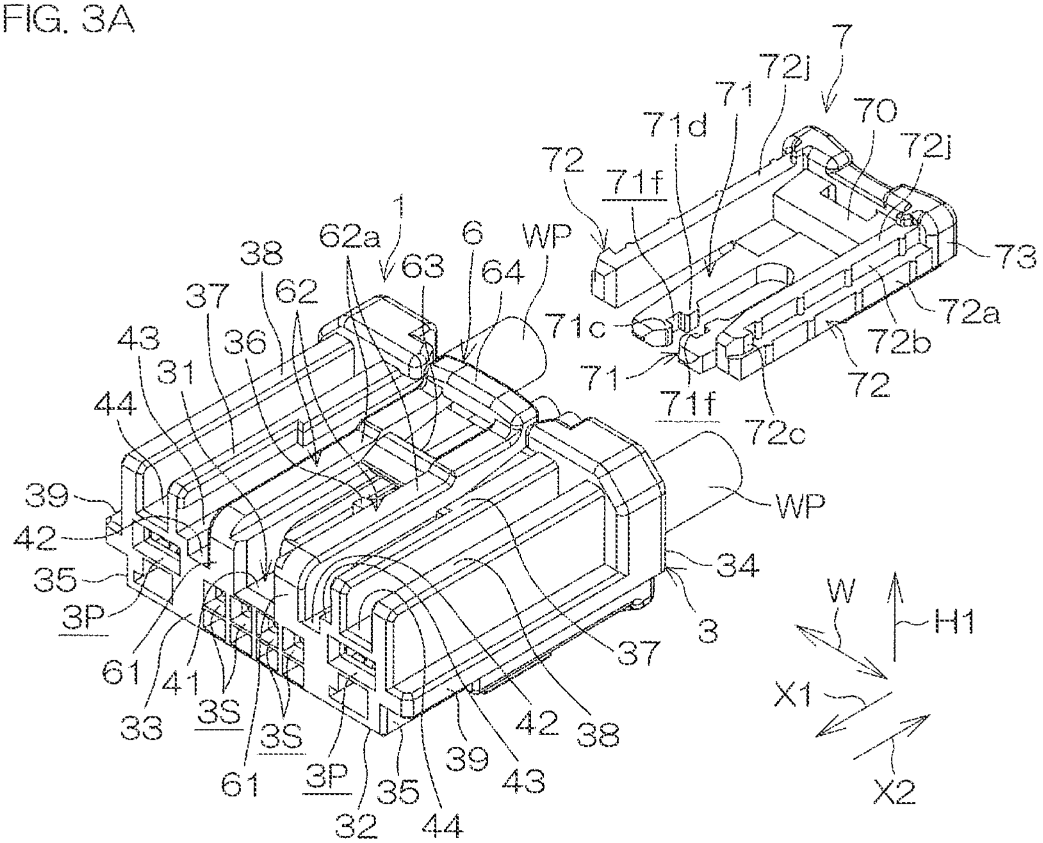
FIG. 3A is an exploded perspective view of the connector.
Figure 3B:
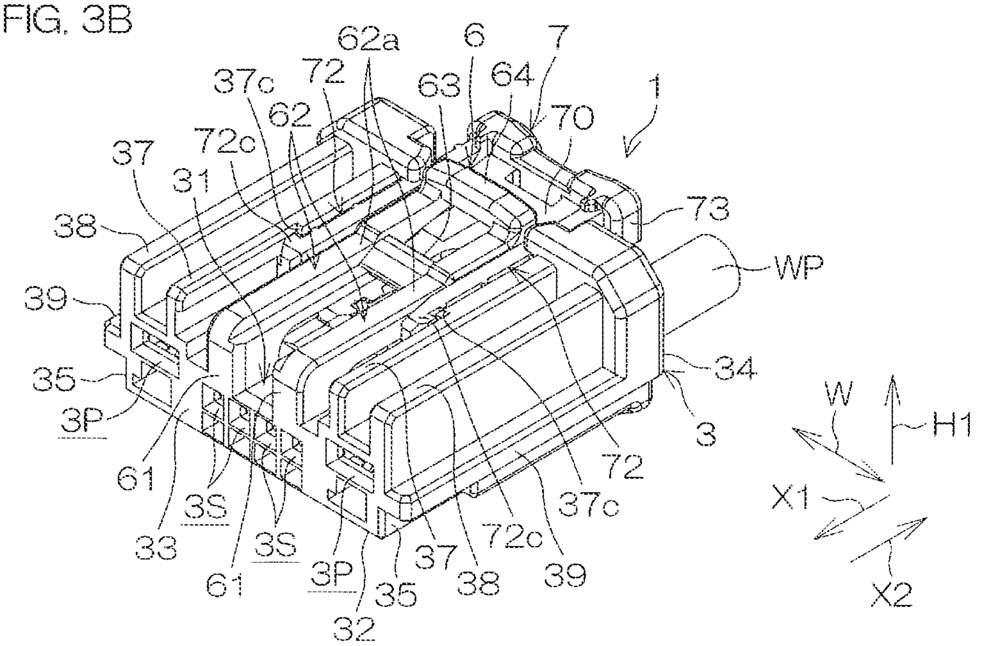
FIG. 3B is a perspective view of the connector.
Figure 4A:
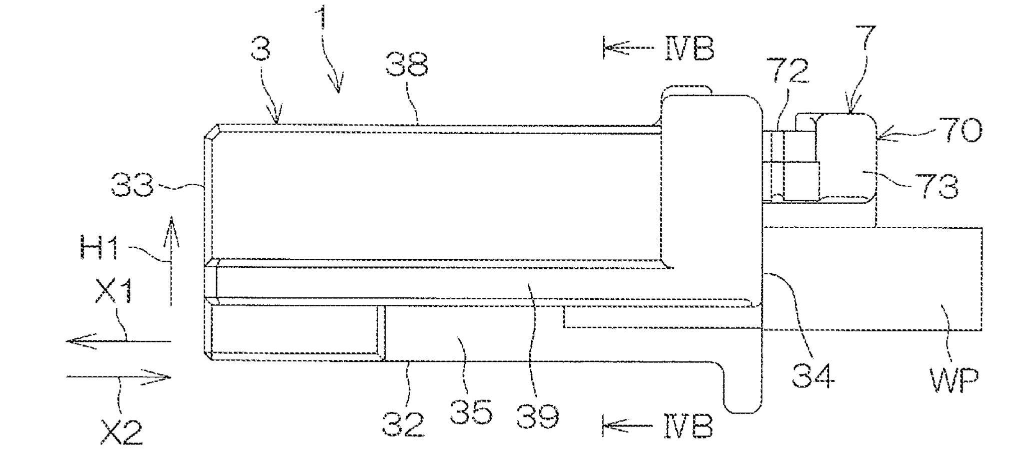
FIG. 4A is a schematic side view of the connector.
Figure 4B:
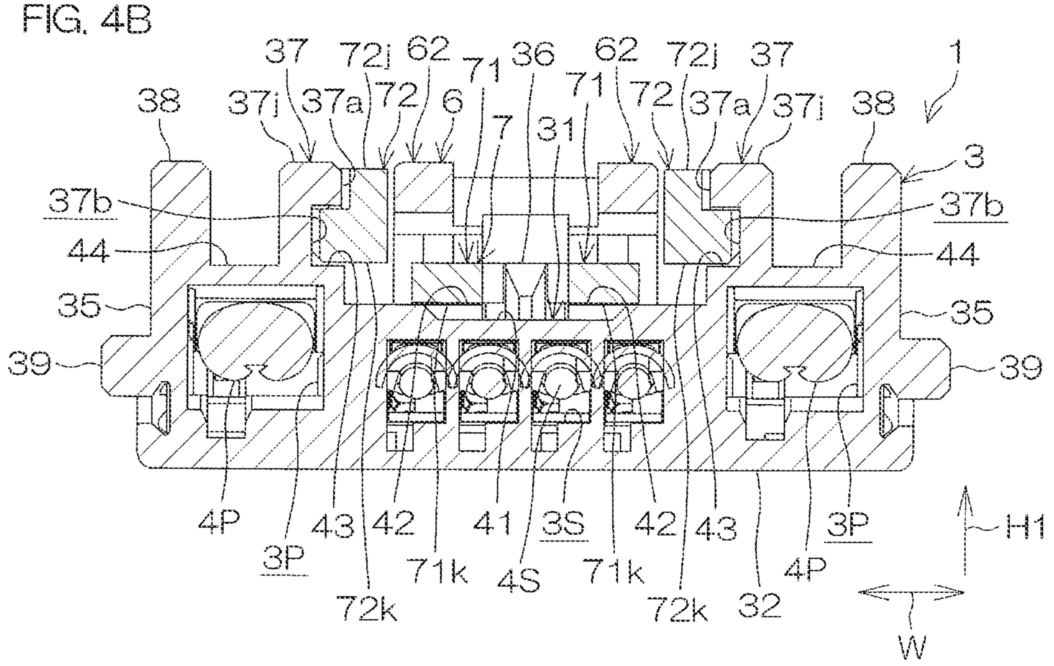
FIG. 4B is a longitudinal cross-sectional view of the connector, and corresponds to a cross-sectional view taken along IVB-IVB in FIG. 4A.
Figure 5A:
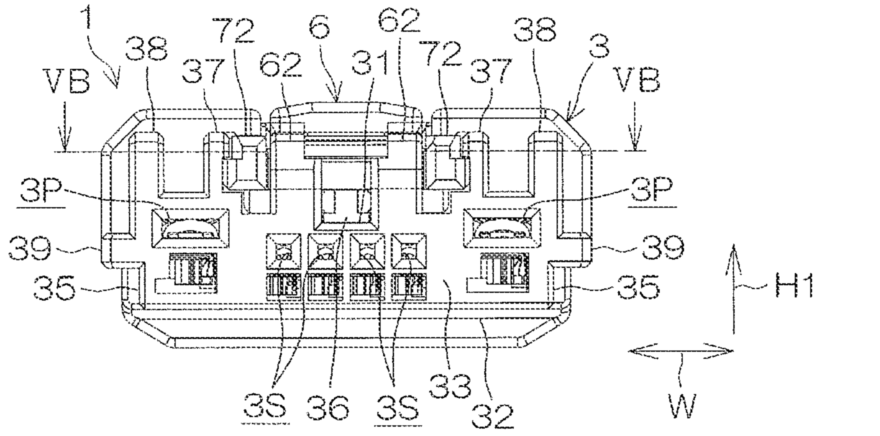
FIG. 5A is a front view of the connector.
Figure 5B:
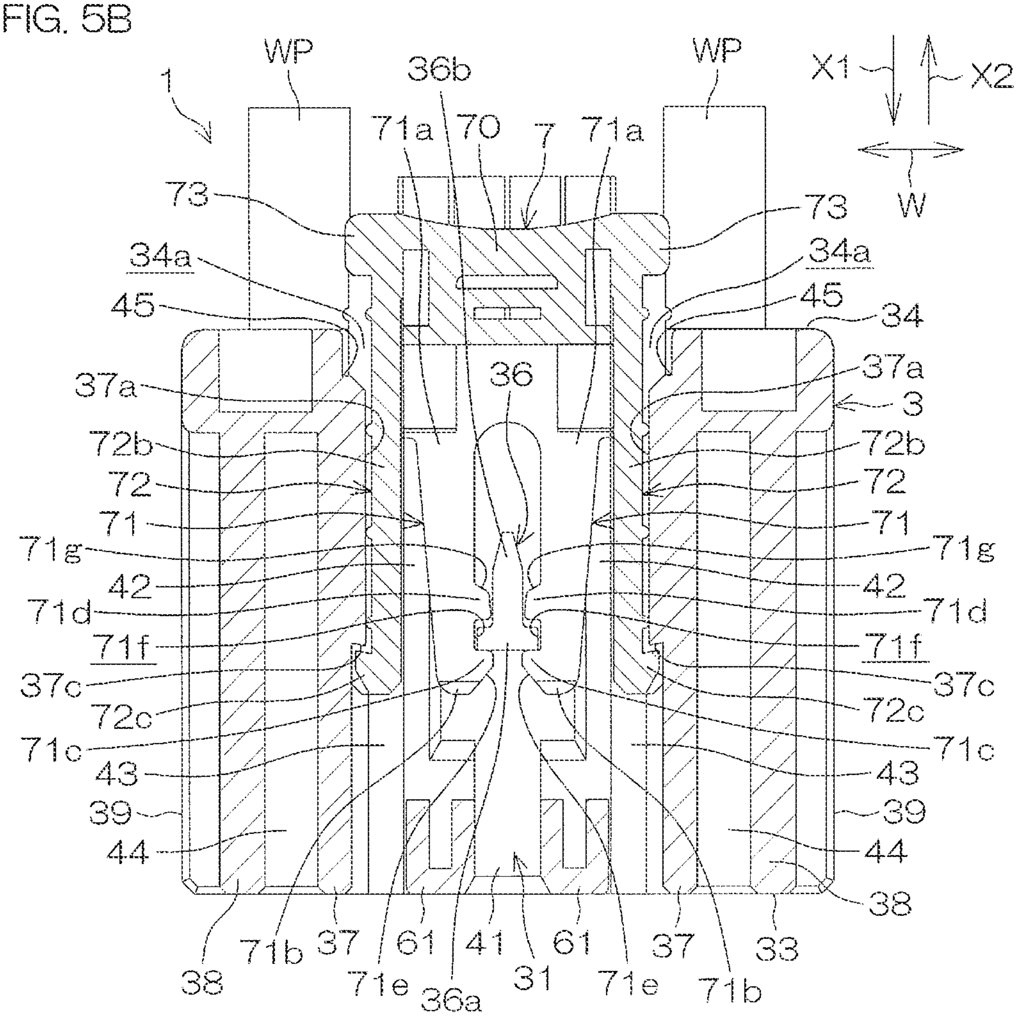
FIG. 5B is a transverse cross-sectional view of the connector, and corresponds to a cross-sectional view taken along VB-VB in FIG. 5A.
Figure 6B:
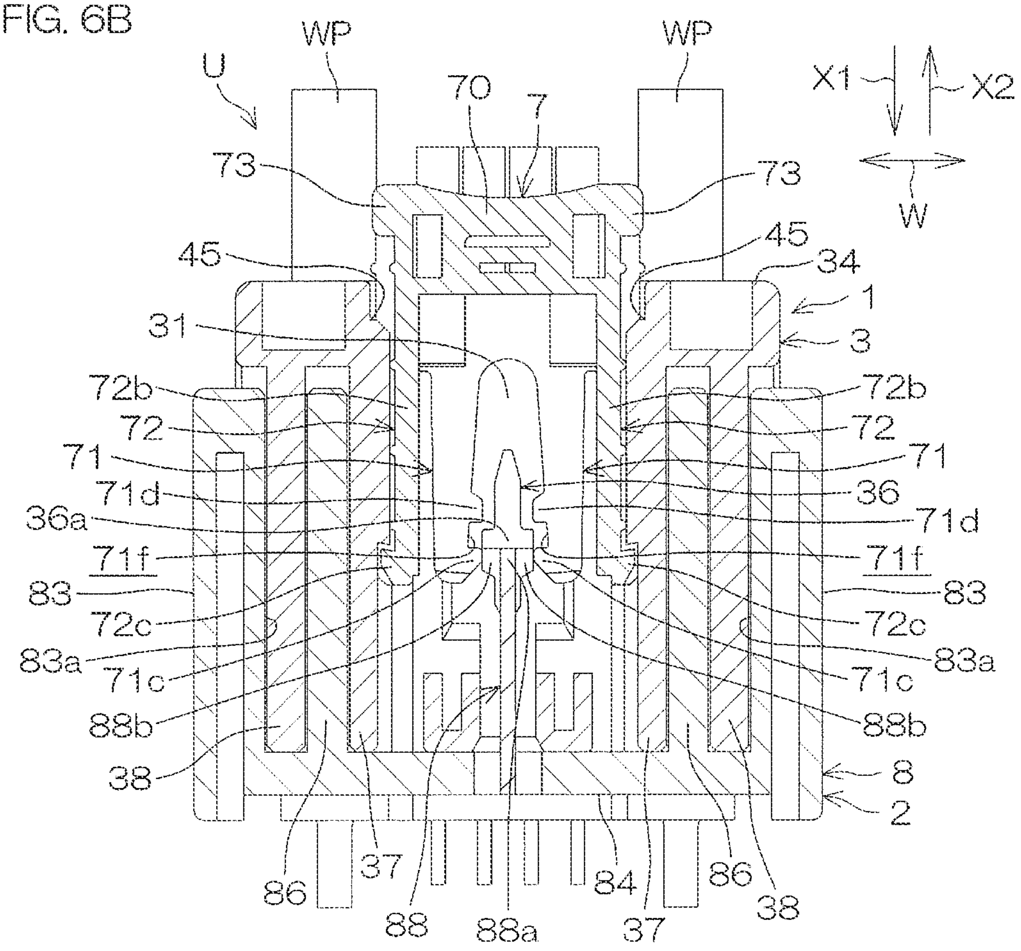
FIG. 6B is a transverse cross-sectional view of the connector pair, and corresponds to a cross-sectional view taken along VIB-VIB in FIG. 6A.

FIG. 3A is an exploded perspective view of the connector 1, and FIG. 3B is a perspective view of the connector 1. FIG. 4A is a schematic side view of the connector 1. FIG. 4B is a longitudinal cross-sectional view of the connector 1 as viewed in the insertion direction X1, and corresponds to a cross-sectional view taken along IVB-IVB in FIG. 4A. FIG. 5A is a front view of the connector 1. FIG. 5B is a transverse cross-sectional view of the connector 1, and corresponds to a cross-sectional view taken along VB-VB in FIG. 5A. FIG. 6A is a rear view of the connector pair U. FIG. 6B is a transverse cross-sectional view of the connector pair U, and corresponds to a cross-sectional view taken along VIB-VIB in FIG. 6A.

First, description will be given of the housing 3 with reference to FIG. 3A, FIG. 3B, FIG. 4A, and FIG. 4B.

The housing 3 is formed in a substantially rectangular parallelepiped shape, and includes, as outer wall surfaces, a top wall surface 31, a bottom wall surface 32, a front wall surface 33, a rear wall surface 34, and a pair of sidewall surfaces 35. In the housing 3, a plurality of terminal housing holes 3S, 3P are formed that are open in the front wall surface 33 and the rear wall surface 34 and extend in the insertion direction X1. A plurality of terminal housing holes 3S are disposed aligned in the width direction W, and a pair of terminal housing holes 3P are disposed on both sides with the plurality of terminal housing holes 3S interposed in the width direction W. Each one of the signal terminal 4S is housed and held by a corresponding terminal housing hole 3S. Each one of the power terminals 4P is housed and held by a corresponding terminal housing hole 3P.

On the top wall surface 31 as the outer wall surface of the housing 3, a projection 36, the locking mechanism 6, a pair of inner ribs 37, and a pair of outer ribs 38 are disposed. The pair of inner ribs 37 are disposed on both sides with the projection 36 interposed in the width direction W. The pair of outer ribs 38 are disposed on both sides with the pair of inner ribs 37 interposed in the width direction W. Further, on the pair of sidewall surfaces 35 of the housing 3, a pair of lateral ribs 39 are formed that protrude laterally and extend in the insertion direction X1.

As shown in FIG. 6B, when the housing 3 is insertion-fitted into the insertion chamber 100 of the mating housing 8, each one of the outer ribs 38 of the housing 3 is guided between a corresponding guide rib 86 and the inner wall surface 83*a* of a corresponding sidewall portion 83 of the mating housing 8. Further, the pair of lateral ribs 39 of the housing 3 are guided by the guide grooves 85 of the pair of sidewall portions 83 of the mating housing 8.

As shown in FIG. 3A and FIG. 4B, the top wall surface 31 includes a projection forming portion 41, a pair of central guide portions 42, a pair of side guide portions 43, and a pair of outer rib forming portions 44. The projection forming portion 41 is disposed at a central portion in the width direction W of the top wall surface 31. The pair of central guide portions 42 are disposed on both sides with the projection forming portion 41 interposed in the width direction W. The pair of side guide portions 43 are disposed on both sides with the pair of central guide portions 42 interposed in the width direction W. The pair of outer rib forming portions 44 are disposed on both sides with the pair of inner ribs 37 interposed in the width direction W.

The projection 36 protrudes from the projection forming portion 41 in the height direction H1. The projection 36 is formed in a T-shape in a plan view. That is, the projection 36 includes a latching portion 36*a* having a rectangular shape extending in the width direction W, and a guide portion 36*b* that is extended in the opposite direction X2 to the insertion direction X1 from a central portion in the width direction W of the latching portion 36*a* and has an extension end in a tapered shape.

The pair of central guide portions 42 are disposed higher in position than the projection forming portion 41. The pair of central guide portions 42 serve to respectively guide lower surfaces 71*k* of a pair of elastic pieces 71 (described later) of the regular fitting detecting member 7.

The pair of side guide portions 43 are disposed higher in position than the pair of central guide portions 42. The pair of side guide portions 43 serve to respectively guide lower surfaces 72*k* of a pair of guide pieces 72 (described later) of the regular fitting detecting member 7. Further, the pair of side guide portions 43 also serve as inner rib forming portions form which the pair of inner ribs 37 are formed in a protruding manner.

As shown in FIG. 4B, on inner side surfaces 37*a* of base portions of the pair of inner ribs 37, guide grooves 37*b* each showing a rectangular shape in a section are formed. An inner wall surface on a lower side of each guide groove 37*b* corresponds to the side guide portion 43 that guides the lower surface 72*k* of a corresponding guide piece 72 of the regular fitting detecting member 7. The pair of outer rib forming portions 44 are disposed at the same height positions as the pair of side guide portions 43.

Further, as shown in FIG. 5B, the bottom of a recess portion 34*a* formed on the rear wall surface 34 constitutes a detected portion 45. The detected portion 45 abuts against a detecting portion 73 (described later) of the regular fitting detecting member 7.

Next, the locking mechanism 6 will be described.

As shown in FIG. 3A, the locking mechanism 6 includes a pair of support portions 61, a pair of arm portions 62, a hook portion 63, and a finger operating portion 64. The pair of support portions 61 are formed in a protruding manner, in the position of an end portion at the side in the insertion direction X1 of the top wall surface 31, on both sides with the projection forming portion 41 interposed in the width direction W. The pair of arm portions 62 are extended in the opposite direction X2 to the insertion direction X1 from each corresponding support portion 61. Intermediate portions 62*a* of the arm portions 62 are mutually coupled by the hook portion 63 that is for locking use. Extension ends of the arm portions 62 are mutually coupled by the finger operating portion 64 that is for lock releasing operation use. The pair of arm portions 62 are each supported in a cantilevered manner by each corresponding support portion 61, and can be elastically deflected and displaced up and down with respect to that support portion 61 serving as a fulcrum.

When fitting to the mating connector 2, the locking mechanism 6 is inserted together with the housing 3 into the insertion chamber 100 of the mating housing 8. With the insertion, the pair of arm portions 62 are once deflected and then elastically restored, whereby the hook portion 63 climbs over and is latched on the latching portion 87 (see FIG. 2A) in the insertion chamber 100. Thus, a fitting state between the connector 1 and the mating connector 2 is locked by the locking mechanism 6.

Next, the regular fitting detecting member 7 will be described in detail.

Figure 7:
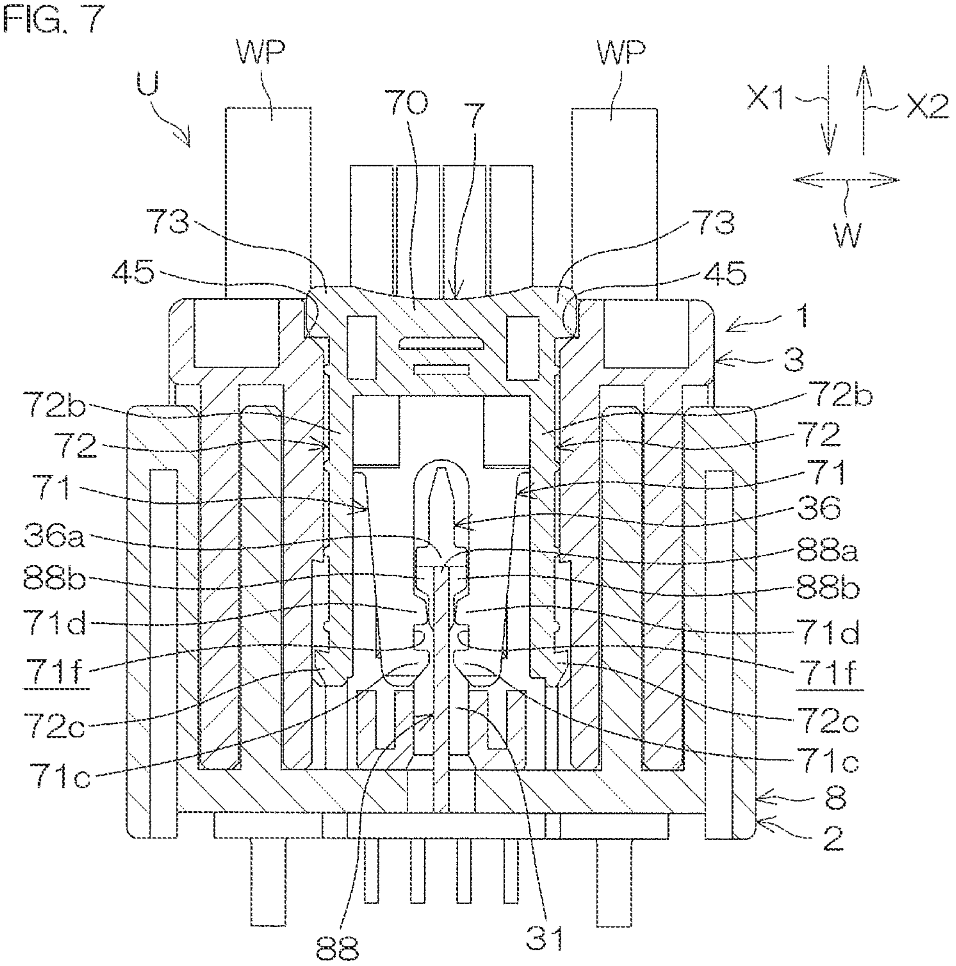
FIG. 7 is a transverse cross-sectional view of the connector pair in a regular fitting state, showing a state in which a regular fitting detecting member is at a detection position.

The regular fitting detecting member 7 is supported on the top wall surface 31 as the outer wall surface along the insertion direction so as to be slidable to a non-detection position (see FIG. 5B) and a detection position (see FIG. 7). The detection position is a position that is further in the insertion direction X1 than the non-detection position, and the regular fitting detecting member 7 detects regular mating with respect to the mating connector 2 at that detection position.

The regular fitting detecting member 7 includes a base portion 70, the pair of elastic pieces 71, the pair of guide pieces 72, and the detecting portion 73. The base portion 70 is formed in a block shape. The detecting portion 73 is formed by a flange shaped portion that protrudes outside from an end portion in the opposite direction X2 to the insertion direction X1 of the base portion 70. The detecting portion 73 abuts against the detected portion 45 (see FIG. 5B) of the detected portion 45 of the housing 3 at the detection position to thereby detect regular fitting with respect to the mating connector 2.

The pair of elastic pieces 71 extend in parallel from the base portion 70 in the insertion direction X1, and separate from each other in the width direction W. The pair of guide pieces 72 are disposed on both sides with the pair of elastic pieces 71 interposed in the width direction W and on both sides with the locking mechanism 6 interposed in the width direction W, and extend in parallel from the base portion 70 in the insertion direction X1.

As shown in FIG. 3A and FIG. 4B, each guide piece 72 shows an angled shape in a section, and includes a lower portion 72*a* that is wider in the width direction W and an upper portion 72*b* narrower in width than the lower portion 72*a*. A portion of the lower portion 72*a* overhangs laterally relative to the upper portion 72*b*, and the overhanging portion is fitted to the guide groove 37*b* of a corresponding inner rib 37 to be guided.

Further, at a distal end portion of the upper portion 72*b*, an outward hook portion 72*c* is provided. As shown in FIG. 5B, the hook portion 72*c* is hooked and latched on a latching step portion 37*c* of the inner side surface 37*a* when the regular fitting detecting member 7 is at the non-detection position, whereby the regular fitting detecting member 7 is prevented from being detached from the housing 3. Upper surfaces 72*j* of the pair of guide pieces 72 are set at a height equal to or lower than the upper surfaces 37*j* of the pair of inner ribs 37.

The pair of elastic pieces 71 are disposed at least in part downward of each corresponding arm portion 62 of the locking mechanism 6. When the regular fitting detecting member 7 is slidingly displaced, the lower surfaces 71*k* of the pair of elastic pieces 71 are respectively slidingly guided by the pair of central guide portions 42 of the top wall surface 31.

Further, when the regular fitting detecting member 7 is slidingly displaced, part of the pair of guide pieces 72 are slidingly guided by the guide groove 37*b* of each corresponding inner rib 37. Specifically, the lower surfaces 72*k* (lower surfaces of the lower portions 72*a*) of the pair of guide pieces 72 are respectively slidingly guided by the pair of side guide portions 43 (corresponding to the inner wall surfaces on the lower side of the guide grooves 37*b*) of the top wall surface 31.

The lower surfaces 72*k* of the guide pieces 72 guided by the side guide portions 43 and the lower surfaces 71*k* of the elastic pieces 71 guided by the central guide portions 42 are disposed in a manner that shifts the position in the height direction H1. Specifically, the lower surfaces 72*k* of the guide pieces 72 are disposed higher in position than the lower surfaces 71*k* of the elastic pieces 71.

Further, the plurality of signal terminals 4S (central terminals) are disposed aligned in the width direction W downward or obliquely downward of the pair of elastic pieces 71. The pair of power terminals 4P (side terminals) are disposed downward or obliquely downward of the pair of guide pieces 72 on both sides with the plurality of the signal terminals 4S (central terminals) interposed in the width direction W.

Each elastic piece 71 is supported by the base portion 70 in a cantilevered manner. Each elastic piece 71 has a proximal end portion 71*a* which is a fixing end portion to be fixed to the base portion 70 and a distal end portion 71*b* which is a free end portion. In the vicinity of the distal end portions 71*b* of the pair of elastic pieces 71, at inner side surfaces, trapezoidal first projections 71*c* that protrude inward and trapezoidal second projections 71*b* that protrude inward are formed. The first projections 71*c* are disposed closer to the distal end portions 71*b* than the second projections 71*d*.

The trapezoidal first projections 71*c* of the pair of elastic pieces 71 have, as surfaces at the side in the insertion direction X1, inclined surfaces 71*e* that are distant from each other in the width direction W along the insertion direction X1. Further, a rectangular groove 71*f* for latching use is formed between the first projection 71*c* and the second projection 71*d* of each elastic piece 71.

The trapezoidal second projections 71*d* of the pair of elastic pieces 71 have, as surfaces in the opposite direction X2 to the insertion direction X1, inclined surfaces 71*g* that approach each other in the width direction W along the insertion direction X1.

Next, description will be given of operation of the regular fitting detecting member 7 separately before the connector is fitted, when the connector is fitted, and when regular fitting is detected.

Figure 9A:
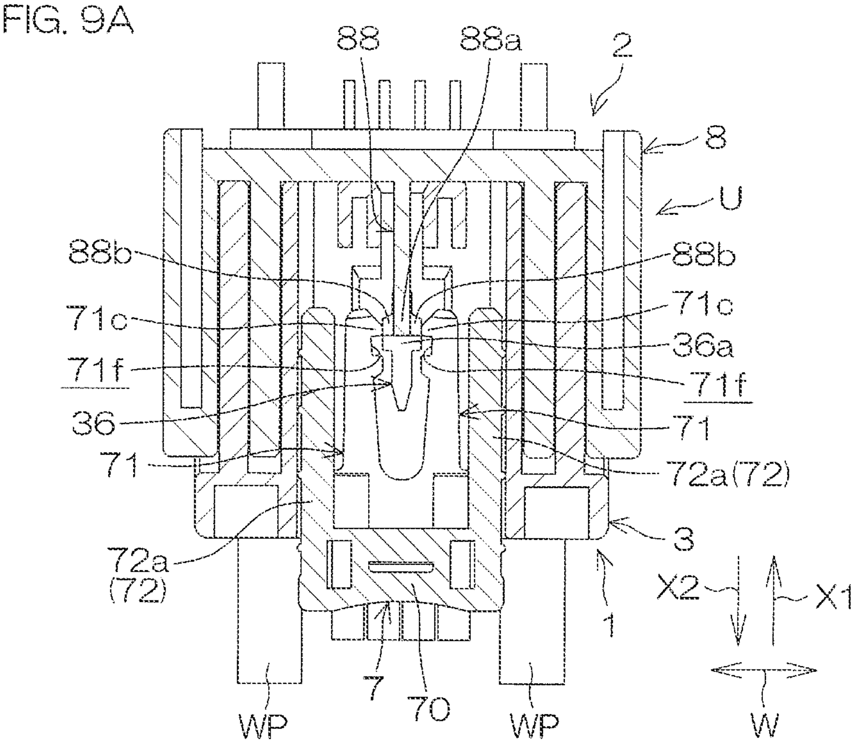
FIG. 9A is a transverse cross-sectional view of the connector pair when fitting, showing a state in which the regular fitting detecting member is at a non-detection position.
Figure 9B:
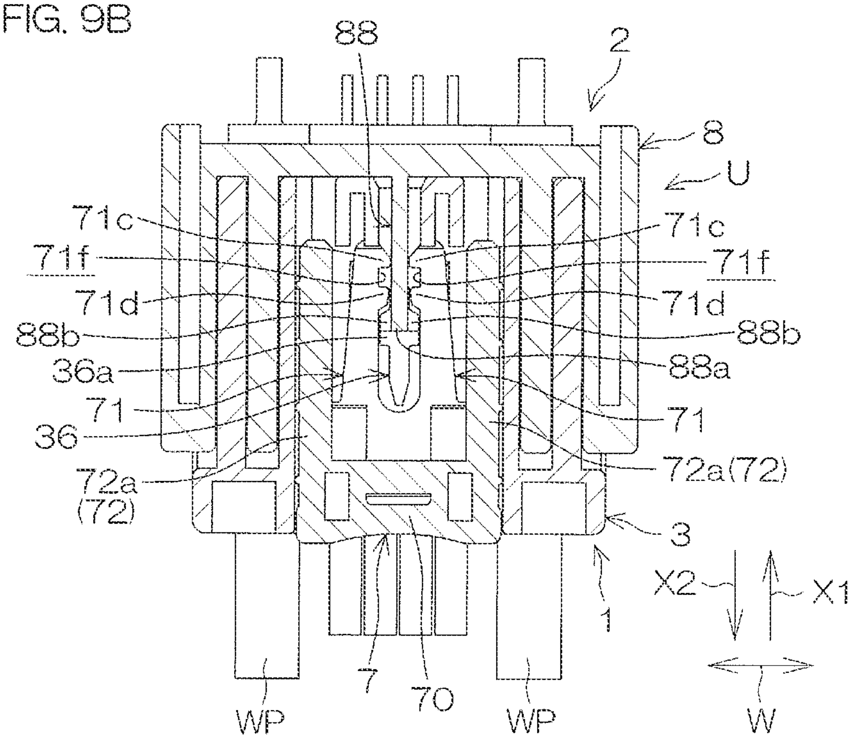
FIG. 9B is a transverse cross-sectional view of the connector pair in a regular fitting state, showing a state in which the regular fitting detecting member is at the detection position.
Figure 10:
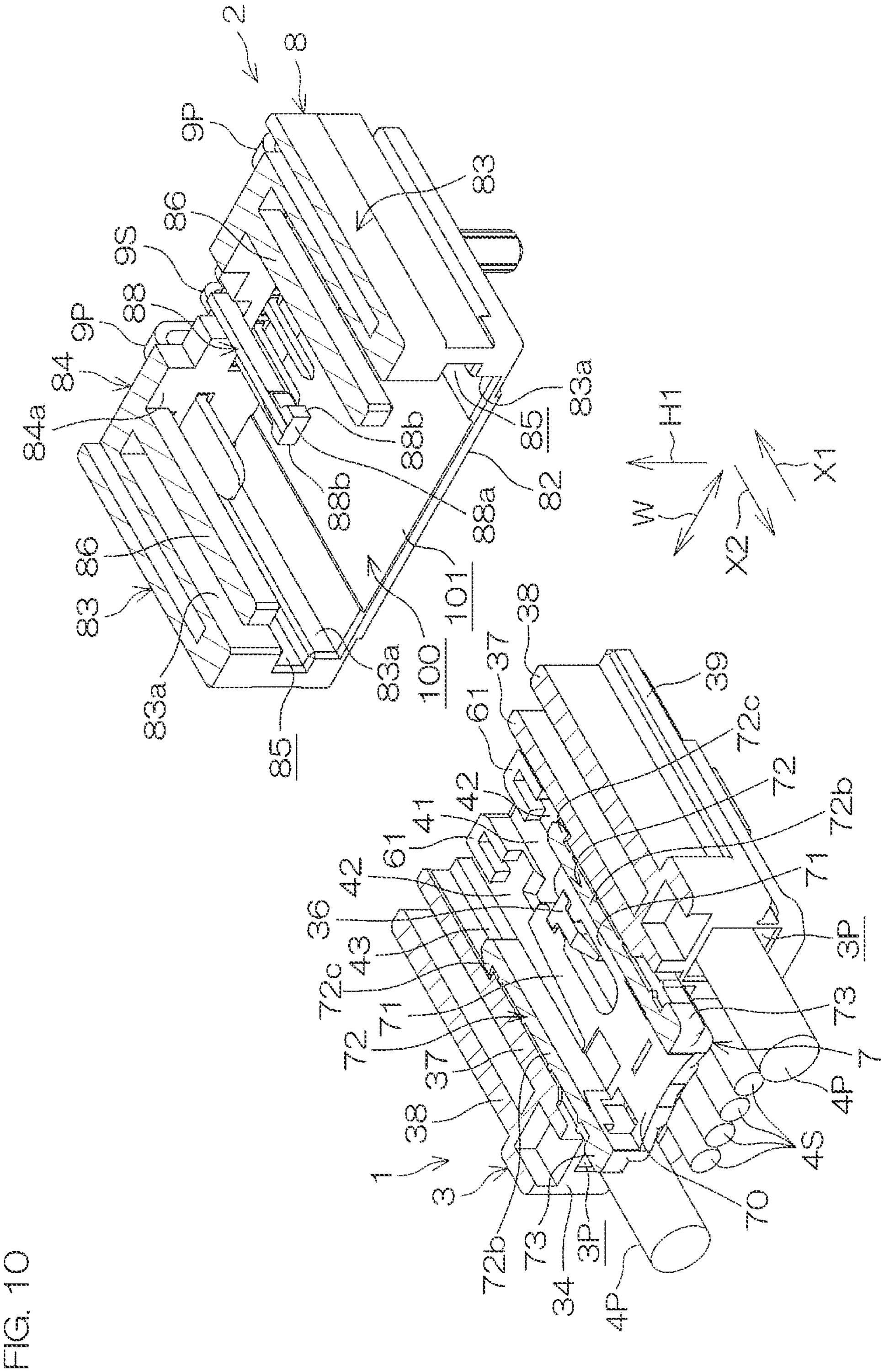
FIG. 10 is an exploded perspective view including transverse cross-sections of the connector pair before fitting.
Figure 11A:
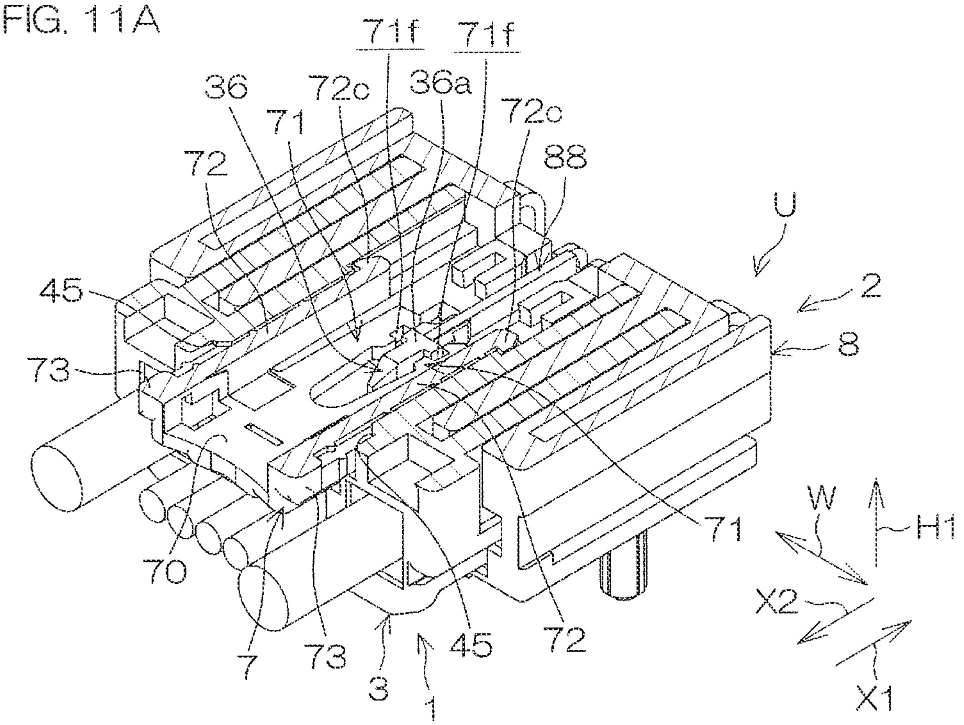
FIG. 11A is a perspective view including transverse cross-sections of the connector pair when fitting, showing a state in which the regular fitting detecting member is at the non-detection position.
Figure 11B:
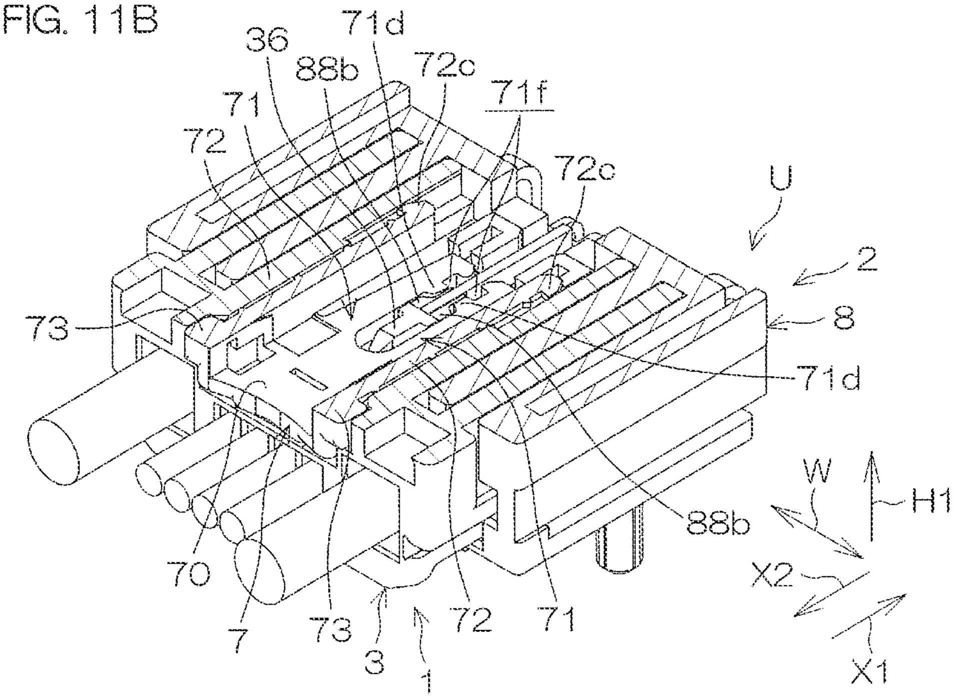
FIG. 11B is a perspective view including transverse cross-sections of the connector pair in a regular fitting state, showing a state in which the regular fitting detecting member is at the detection position.

Specifically, FIG. 5B, FIG. 6B, and FIG. 7 are transverse cross-sectional views sectioned at the upper portions 72*b* of the guide pieces 72, and correspond to before the connector is fitted, when the connector is fitted, and when regular fitting is detected, respectively. Further, FIG. 8, FIG. 9A, and FIG. 9B are transverse cross-sectional views sectioned at the lower portions 72*a* of the guide pieces 72, and correspond to before the connector is fitted, when the connector is fitted, and when regular fitting is detected, respectively. Further, FIG. 10, FIG. 11A, and FIG. 11B are broken-away views sectioned at the upper portions 72*a* of the guide pieces 72, and correspond to before the connector is fitted, when the connector is fitted, and when regular fitting is detected, respectively.

As shown in FIG. 5B (see also FIG. 8 and FIG. 10), before the connector is fitted and when the regular fitting detecting member 7 is at the non-detection position, the latching portion 36*a* of the projection 36 is fitted to the rectangular grooves 71*f* of the pair of elastic pieces 71, and the latching portion 36*a* of the projection 36 is clamped by the pair of elastic pieces 71. By the pair of elastic pieces clamping the projection 36, the regular fitting detecting member 7 is held at the non-detection position with respect to the housing 3. At the non-detection position, the detecting portion 73 of the regular fitting detecting member 7 is separated from the detected portion 45 of the housing 3.

As shown in FIG. 6B (see also FIG. 9A and FIG. 11A), when the connector 1 with the regular fitting detecting member 7 being held at the non-detection position is fitted to the mating connector 2, the pair of wing portions 88*b* of the releasing piece 88 of the mating housing 8 press and expand the distal end portions 71*b* of the pair of elastic pieces 71 via top portions of the first projections 71*c* of the pair of elastic pieces 71, whereby the regular fitting detecting member 7 is released from the holding at the non-detection position with respect to the housing 3, and allows for sliding displacement toward the detection position.

Then, as shown in FIG. 7 (see also FIG. 9B and FIG. 11B), when the regular fitting detecting member 7 is slid to the detection position that is further in the insertion direction X1, the detecting portion 73 abuts against the detected portion 45 of the housing 3, so that regular fitting is detected. Further, the pair of elastic pieces 71 are resiliently restored from the expanding-open state, and the second projections 71*d* of the pair of elastic pieces 71 are disposed further in the insertion direction X1 with respect to the pair of wing portions 88*b* of the releasing piece 88. Thus, the regular fitting detecting member 7 is held at the detection position with a predetermined holding force.

On the other hand, when the base portion 70 of the regular detecting member 7 is drawn in the opposite direction X2 to the insertion direction X1, although this is not illustrated, the pair of wing portions 88*b* of the releasing piece 88 press and expand the distal end portions 71*b* of the pair of elastic pieces 71 via top portions of the second projections 72*k* of the pair of elastic pieces 71, whereby the regular fitting detecting member 7 is released from the holding at the detection position with respect to the housing 3, and allows for sliding displacement toward the non-detection position.

In a preferred embodiment, as shown in FIG. 4B, it becomes possible to dispose the lower surfaces 71*k* of the elastic pieces 71 and the lower surfaces 72*k* of the pair of guide pieces 72 of the regular fitting detecting member 7 disposed on the top wall surface 31 (outer wall surface) of the housing 3, in a manner that shifts the position in the height direction H1 according to a size and layout of the terminals 4 to be disposed downward of the top wall surface 31. Therefore, the housing 3 can be prevented from increasing in size.

Further, the top wall surface 31 (outer wall surface) of the housing 3 includes the central guide portions 42 that guide the lower surfaces 71*k* of the elastic pieces 71 and the pair of side guide portions 43 that guide the lower surfaces 72*k* of the pair of guide pieces 72. Therefore, in the top wall surface 31, the central guide portions 42 to guide the lower surfaces 71*k* of the elastic pieces 71 and the pair of side guide portions 43 to guide the lower surfaces 72*k* of the pair of guide pieces 72 are disposed in a manner that shifts the position in the height direction H1, whereby height positions of the central guide portions 42 and the side guide portions 43 can be adapted to the size, etc., of the terminals 4 to be disposed downward of the top wall surface 31.

Further, the plurality of central terminals (signal terminals 4S) are disposed downward or obliquely downward of the elastic pieces 71 aligned in the width direction W, and the pair of side terminals (power terminals 4P) are disposed downward or obliquely downward of the pair of guide pieces 72 and on both sides with the plurality of the central terminals (signal terminals 4S) interposed in the width direction W. Moreover, the lower surfaces 71*k* of the elastic pieces 71 can be shifted in position in the height direction H1 from the lower surfaces 72*k* of the guide pieces 72, according to differences in size between the central terminals and the side terminals.

Further, the elastic pieces 71 that are disposed at least in part downward of the arm portions 62 of the locking mechanism 6 is restricted in the height direction H1 in terms of the layout. On the other hand, the pair of guide pieces 72 disposed on both sides with the locking mechanism 6 interposed in the width direction W has a margin in the height direction H1 in terms of the layout. Accordingly, the lower surfaces 72*k* of the guide pieces 72 corresponding to the side terminals (power terminals 4P) as large-sized terminals are disposed higher in position than the lower surfaces 71*k* of the elastic pieces 71 corresponding to the central terminals (signal terminals 4S) as small-sized terminals.

That is, the height of the lower surfaces 72*k* of the guide pieces 72 corresponding to the power terminals 4P that are larger in size than the signal terminals 4S is made higher than the height of the lower surfaces 71*k* of the elastic pieces 71 corresponding to the signal terminals 4S. Thus, space can be effectively used in terms of laying out the terminal housing holes 3P, 3S to house the terminals 4P, 4S in the housing 3, so as to prevent an increase in size of the connector 1.

Moreover, the pair of inner ribs 37 are a pair of protective ribs that are as a rule provided on both sides of the locking mechanism 6 in order to prevent foreign matter from entering the locking mechanism 6. The upper surfaces 72*j* of the pair of guide pieces 72 are at the height equal to or lower than the upper surfaces 37*j* of the inner ribs 37. That is, while the lower surfaces 72*k* of the guide pieces 72 are made higher by a predetermined shift amount than the lower surfaces 71*k* of the elastic pieces 71, the shift amount is set so as to satisfy such a condition that the upper surfaces 72*j* of the guide pieces 72 do not exceed the height of the upper surfaces 37*j* of the inner ribs 27 (protective ribs) where the upper surfaces 72*j* of the guide pieces 72 are originally positioned. Thus, the connector 1 can be prevented from increasing in size in the height direction H1.

Further, the pair of elastic pieces 71 of the regular fitting detecting member 7 clamp the projection 36 in the width direction W to thereby hold the regular fitting detecting member 7 at the non-detecting portion (see FIG. 5B). Further, the pair of elastic pieces 71 are expanded and opened by the releasing piece 88 disposed in the insertion chamber 100 of the mating connector 2 to thereby release latching with respect to the projection 36 when the connector is fitted (see FIG. 6B). Therefore, operations of the latching and releasing of the latching with respect to the projection 36 by the pair of elastic pieces 71 can be reliably performed.

Further, an increase in size can be prevented for the connector pair U including the connector 1 and the mating connector 2.

In a preferred embodiment, although this is not illustrated, the lower surfaces 71*k* of the elastic pieces 71 may be disposed higher in position than the lower surfaces 72*k* of the guide pieces 72 as long as the lower surfaces 71*k* of the elastic pieces 71 are disposed in a manner that shifts the position in the height direction H1 from the lower surfaces 72*k* of the guide pieces 72. Further, various features described above may be appropriately combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A connector comprising: a housing which has a height direction and a width direction perpendicular to each other, and is configured to be inserted and fitted into an insertion chamber of a mating housing of a mating connector in an insertion direction perpendicular to the height direction and the width direction;

a plurality of terminals which are respectively housed in a plurality of terminal housing holes formed in the housing; and a regular fitting detecting member which is supported on an outer wall surface along the insertion direction of the housing so as to be slidable in the insertion direction to a non-detection position and a detection position positioned further in the insertion direction than the non-detection position, and is configured to detect regular fitting with the mating connector, the regular fitting detecting member being elastically clamped or latched when at the non-detection position, wherein the regular fitting detecting member includes a base portion which has a detecting portion which is configured to detect the regular fitting by abutting against the housing at the detection position, a pair of elastic pieces which extends in the insertion direction from the base portion, and allows the regular fitting detecting member to move to the detection position by being elastically deformed in the width direction, and a pair of guide pieces which are configured to guide the sliding of the regular fitting detecting member by engagement with the housing, each of the pair of elastic pieces includes a lower surface and a groove for fitting and clamping therein a projection of the housing, and each of the pair of guide pieces includes a lower surface, such that the lower surface of each of the pair of elastic pieces is shifted from the lower surface of each of the pair of guide pieces in the height direction.

2. The connector according to claim 1, wherein the outer wall surface includes a central guide portion which is configured to guide the lower surface of each of the pair of elastic pieces, and a pair of side guide portions which are configured to guide the lower surfaces of the pair of guide pieces.

3. The connector according to claim 1, wherein the projection of the housing protrudes in the height direction from the outer wall surface, the regular fitting detecting member includes a pair of the elastic pieces, the pair of elastic pieces are configured to hold the regular fitting detecting member when at the non-detection position by clamping or latching the projection in the width direction, and the pair of elastic pieces are configured to release clamping or latching with respect to the projection by being expanded and opened by a releasing piece disposed in the insertion chamber of the mating connector when the connector is fitted to the mating connector.

4. A connector pair comprising the connector according to claim 1, and the mating connector to be fitted with the connector.

5. The connector according to claim 1, wherein the plurality of terminals include a plurality of central terminals which align in the width direction downward or obliquely downward of each of the pair of elastic pieces and a pair of side terminals which are disposed downward or obliquely downward of the pair of guide pieces and on both sides in the width direction with respect to the plurality of central terminals, as viewed in the insertion direction.

6. The connector according to claim 5, further comprising a locking mechanism which includes a support portion supported on the outer wall surface and an arm portion extending from the support portion parallel to the insertion direction, and allows for locking a fitting state with respect to the mating connector, wherein each of the pair of elastic pieces is disposed at least in part downward of the arm portion, the pair of guide pieces are disposed on both sides with the locking mechanism interposed in the width direction, and the lower surface of each of the guide pieces is disposed higher in position than the lower surface of the each of the pair of elastic pieces, and the side terminal is a terminal larger in size than the central terminal.

7. The connector according to claim 6, wherein the central terminal includes a signal terminal, and the side terminal includes a power terminal.

8. The connector according to claim 6, further comprising a pair of protective ribs which are respectively formed in a protruding manner on the outer wall surface of the housing, and extend in the insertion direction at both sides with the locking mechanism interposed in the width direction, and configured to protect the locking mechanism, wherein the guide piece includes an upper surface, each of the pair of protective ribs includes an upper surface, and the upper surface of the guide piece is at a height equal to or lower than the upper surface of each of the pair of protective ribs.

* * * * *